United States Patent

[11] 3,561,725

| [72] | Inventor | Jorge Torres<br>Los Angeles, Calif. |
|---|---|---|
| [21] | Appl. No. | 845,632 |
| [22] | Filed | July 7, 1969 |
| [45] | Patented | Feb. 9, 1971 |
| [73] | Assignee | Purolator Inc.<br>Rahway, N.J.<br>a corporation of Delaware<br>Continuation of application Ser. No.<br>547920, May 5, 1966, now abandoned. |

[54] VALVED COUPLING
4 Claims, 9 Drawing Figs.

[52] U.S. Cl. .................................................. 251/149.2,
285/18, 285/277
[51] Int. Cl. ................................................. F16k 51/00,
F 161 35/00, F161 27/00
[50] Field of Search........................................... 85/8.9;
251/149.1, 149.2, 149.4, 303; 285/1, 18, 83, 90,
277, 304, 316, R.C.; 137/625.28, 625.31, 512.1, 375

[56] References Cited
UNITED STATES PATENTS

| 1,375,555 | 4/1921 | Brown | 137/512.1 |
| 1,393,204 | 10/1921 | Daggett | 137/512.1X |
| 1,708,907 | 4/1929 | Spencer | 137/512.1 |
| 1,793,547 | 2/1931 | Gray | 137/512.1 |
| 2,824,755 | 2/1958 | Lamphear | 251/149.2 |
| 3,026,901 | 3/1962 | Wheeler | 137/512.1 |
| 3,077,330 | 2/1963 | Lamphear | 285/83X |
| 3,127,148 | 3/1964 | Collar | 251/149.2 |

*Primary Examiner*—Henry T. Klinksiek
*Attorney*—Smyth, Roston & Pavitt

ABSTRACT: A coupling on a hose for releasable connection to a jet engine for starting the jet engine by heated compressed air has a valve to prevent the hose from whipping around when disconnected. The valve comprises two leaves that diverge upstream to be closed and held closed by fluid pressure and the two leaves are opened in response by coupling the hose to the engine. A locking sleeve that is movable to lock the engine-engaging means is mounted between two radial flanges that protect the sleeve when the end of the hose is dropped onto a hard surface. The locking sleeve is equipped with a removable lanyard.

INVENTOR:
JORGE TORRES

ATTORNEYS

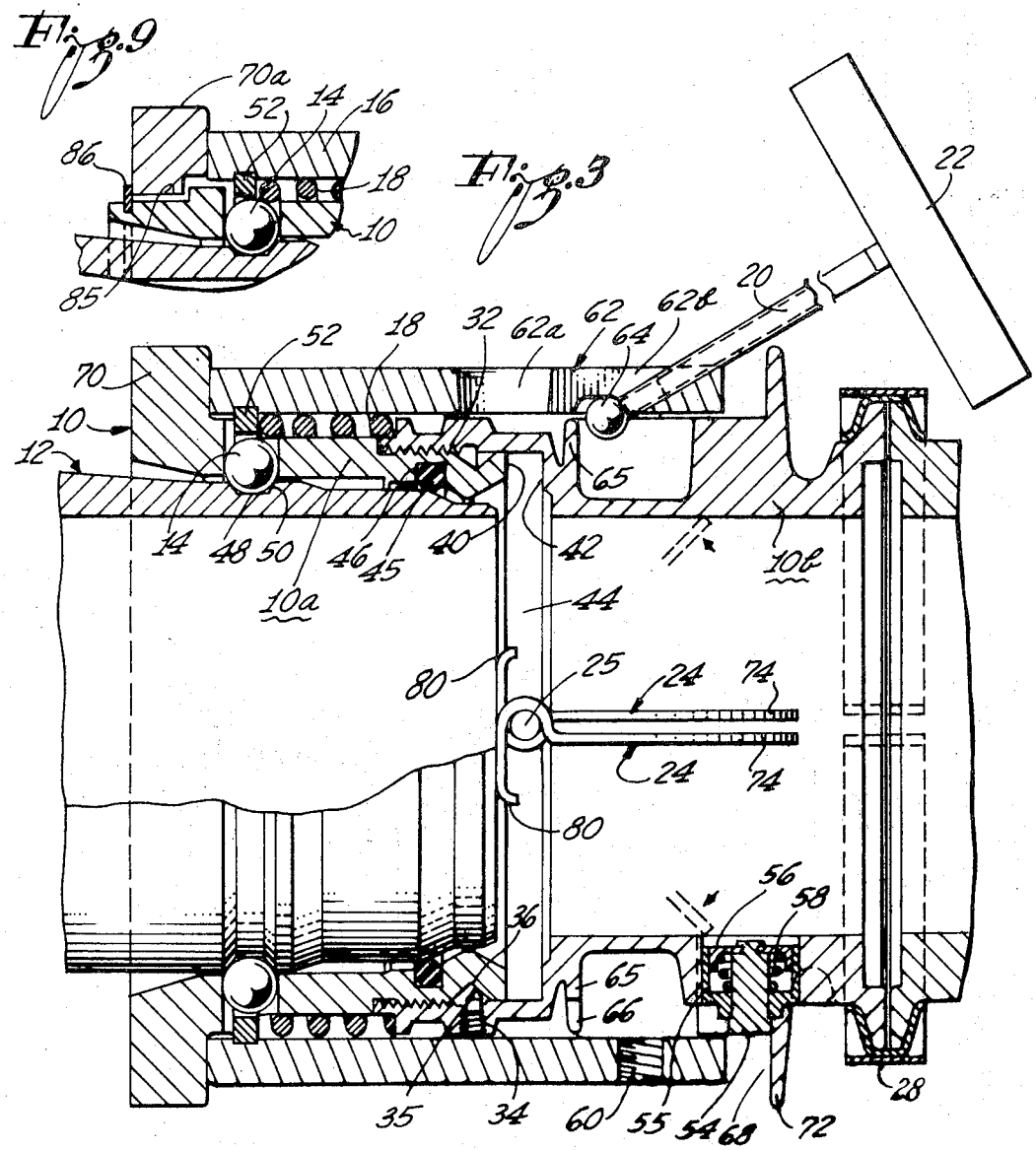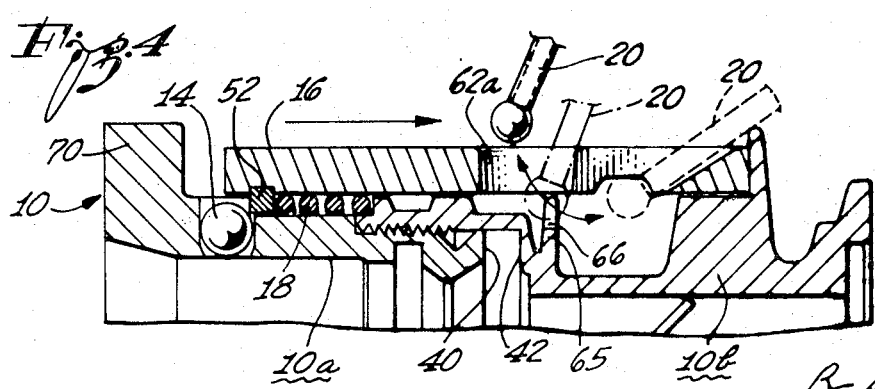

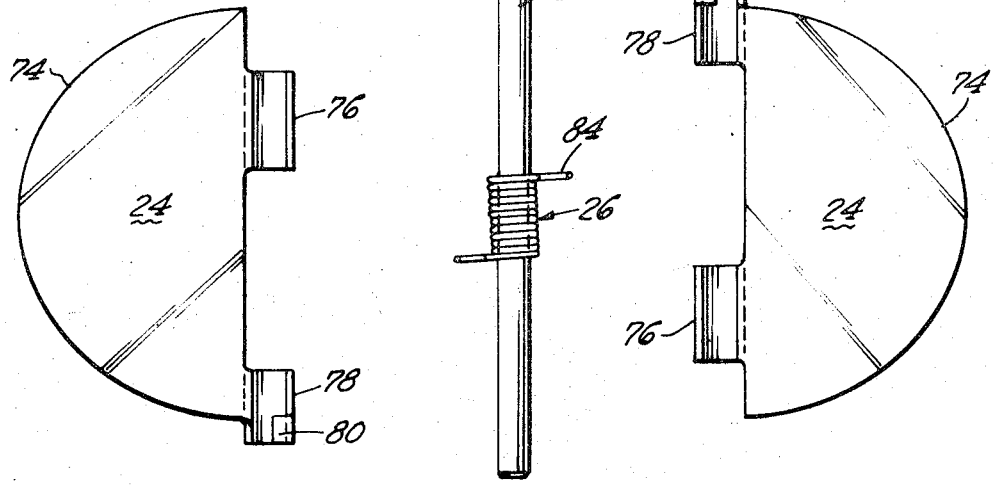
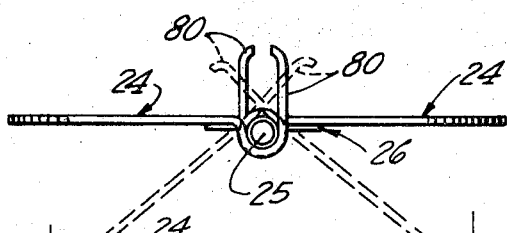
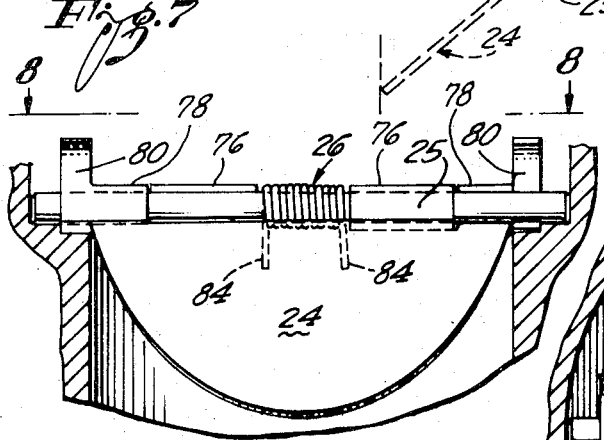
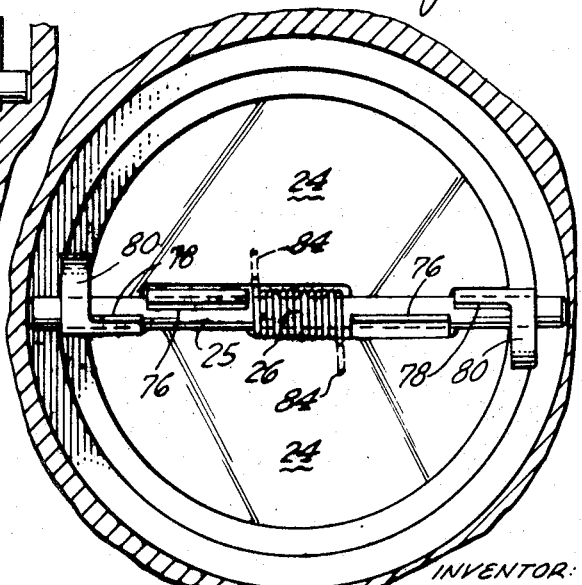

VALVED COUPLING

CROSS-REFERENCE TO RELATED APPLICATIONS

This application is a continuation of my application Ser. No. 547,920, filed May 5, 1966 (now abandoned).

This invention relates to a coupling for releasable engagement with an end of a fluid passage member for conveyance of a fluid stream.

While the invention has features that make it applicable for various purposes in various fields, the present disclosure is directed specifically to the problems and difficulties that arise in temporarily connecting a jet engine with a source of compressed heated air for the purpose of starting the jet engine. The disclosure will provide adequate guidance for application of the same principles to other specific purposes.

To permit a jet engine to be started by hot compressed air, the engine is equipped with a coupling body, commonly termed an adapter, that forms an inlet for the compressed air. A second coupling body for cooperation with the adapter is mounted on the end of a flexible hose which is connected to the compressed air source and the second coupling body is commonly termed a socket since it telescopically receives the leading end of the adapter. The supply of hot compressed air to the flexible hose is controlled by a valve at the source.

For the purpose of interlocking the two telescoped coupling bodies, the first coupling body or adapter is formed with a rearwardly facing circumferential engagement shoulder and the second coupling body or socket which is the subject of the present invention is equipped with engagement means that contracts radially into engagement with this shoulder. An outer actuating sleeve carried by the socket is movable axially between a release position and a locking position at which it locks the engagement means.

One of the problems to which the invention is directed arises because there is always the possibility that the supply valve at the source will be inadvertently opened when the two coupling bodies are separated from each other or that the two coupling bodies may be inadvertently disconnected while the remote supply valve is open. In such an event, the flexible hose may whip in a hazardous manner in reaction to the escaping high velocity air stream. This problem is solved by providing the coupling body or socket with a valve which automatically closes whenever the socket on the end of the flexible hose is disconnected from the adapter. An important feature of the preferred embodiment of the invention is the manner in which such a valve is constructed and operated.

The valve in the socket comprises two leaves hingedly mounted on a diametric pin to swing between open positions to permit free fluid flow and closed positions to oppose fluid flow. At the closed positions the two valve leaves diverge in the upstream direction, i.e. are inclined upstream from the diametrical pin at acute angles to the axis of the coupling body so that the pressure of the confined fluid tends to spread the two leaves apart against the inner circumferential fold of the coupling body. The two leaves may be fabricated economically since they may be stamped out of sheet metal and may be of identical configuraions.

A feature of the invention is that the two leaves of the valve are provided respectively with operating fingers that lie in the path of insertion of the adapter into the socket. By virtue of this arrangement the leaves swing to their folded open positions automatically in response to engagement of the socket body with the adapter.

Another problem to which the invention is directed is to provide such a socket that will readily withstand heavy impacts without damage. In the usual procedure, as soon as the jet engine is started, the socket on the end of a flexible hose is disengaged from the adapter and the operator simply tosses the socket to one side to permit it to crash to the ground. One of the requirements of the socket is that it pass severe tests in which the socket is dropped a number of times onto a hard surface.

One part of the socket that is ordinarily exposed to such impact is the external actuating sleeve and if the actuating sleeve is made of aluminum to save weight, as in the preferred embodiment of the invention, it is especially vulnerable to damage by impact. Another part that may be exposed to impacts is the encircling clamp ring that joins the socket to the flexible hose.

The invention solves the problem of making the socket proof against impact damage by forming the socket body of high strength steel with two radial flanges at opposite ends of the range of movement of the actuating sleeve. Since both of these flanges extend radially outward beyond the outer circumference of the actuating sleeve, the two flanges serve as an effective impact guard for the actuating sleeve. In addition the rearmost of the two guard flanges is positioned immediately adjacent the encircling hose clamp and is of greater radial dimension than the hose clamp to afford adequate impact protection for the hose clamp.

A feature of the preferred practice of the invention is that the steel body of the socket is made in two sections which are interconnected by screw threads. To insure that the two body sections do not become unscrewed in response to repeated impact forces, a radial set screw on one of the two sections engages a tapered circumferential shoulder on the other section with an effective camming action.

Certain important advantages are made possible by the described construction wherein the coupling body is made in two separate section.

One advantage relates to the previously mentioned inner circumferential groove and the problem of mounting the opposite ends of the previously mentioned diametrical valve pin in the groove. The two sides of the inner circumferential groove are formed by inner circumferential shoulders of the two body sections respectively. By virtue of this arrangement the two body sections may be separated to permit installation of the diametrical pin. Another advantage is that separating the two body sections simplifies the installation of the actuating sleeve and the associated coil spring. Another advantage is in the wide range of tolerances that is permitted in the dimensioning of the two body sections. Thus normal variations in dimension of the mating parts of the two body sections merely results in shifting the point of contact of the previously mentioned set screw on the slope of the cooperating tapered circumferential shoulder. With further reference to liberal tolerances permitted by the invention, it is to be noted that the dimensioning of the two leaves of the valve is not critical.

Another feature of the preferred embodiment of the invention is the concept of providing the actuating sleeve with a lanyard that may be quickly and easily replaced whenever necessary. For this purpose the inner end of the lanyard is provided with an enlargement and the actuating sleeve is formed with a keyhole with one portion of the keyhole narrower than the enlargement and with another portion of the keyhole larger to clear the enlargement. Normally the enlargement of the inner end of the lanyard is captive in engagement with the narrower part of the keyhole, the enlargement being trapped by an outer circumferential shoulder of the socket body which shoulder is concealed by the surrounding actuating sleeve. Whenever it is desirable to disengage the lanyard from the operating sleeve, the operating sleeve is rotated to place the keyhole in register with a notch or recess in the circumferential shoulder to permit the enlargement on the inner end of the lanyard to be shifted to the larger portion of the keyhole.

The various features and advantages of the invention may be understood from the following detailed description together with the accompanying drawings.

In the drawings, which are to be regarded as merely illustrative:

FIG. 3 is a longitudinal sectional view similar to FIG. 1 showing the adapter in locked telescopic engagement with the socket;

FIG. 4 is a fragmentary sectional view indicating how the lanyard may be disengaged from the actuating sleeve;

FIG. 5 is a plan view of the two valve leaves and the cooperating diametrical pin on which the valve leaves are pivoted, the two valve leaves being shown as separated from the pin;

FIG. 6 is an elevational view to show how the two valve leaves may be assembled to the diametrical pin in preparation for assembly to the socket;

FIG. 7 is a fragmentary sectional view showing the pair of valve leaves in side elevation in their unfolded or closed position;

FIG. 8 is a transverse sectional view showing the closed valve leaves in elevation as viewed along the line 8–8 of FIG. 7; and FIG. 9 is a fragmentary sectional view showing how a flange of the socket body may be a separate ring removably mounted on the body.

Figure 1:
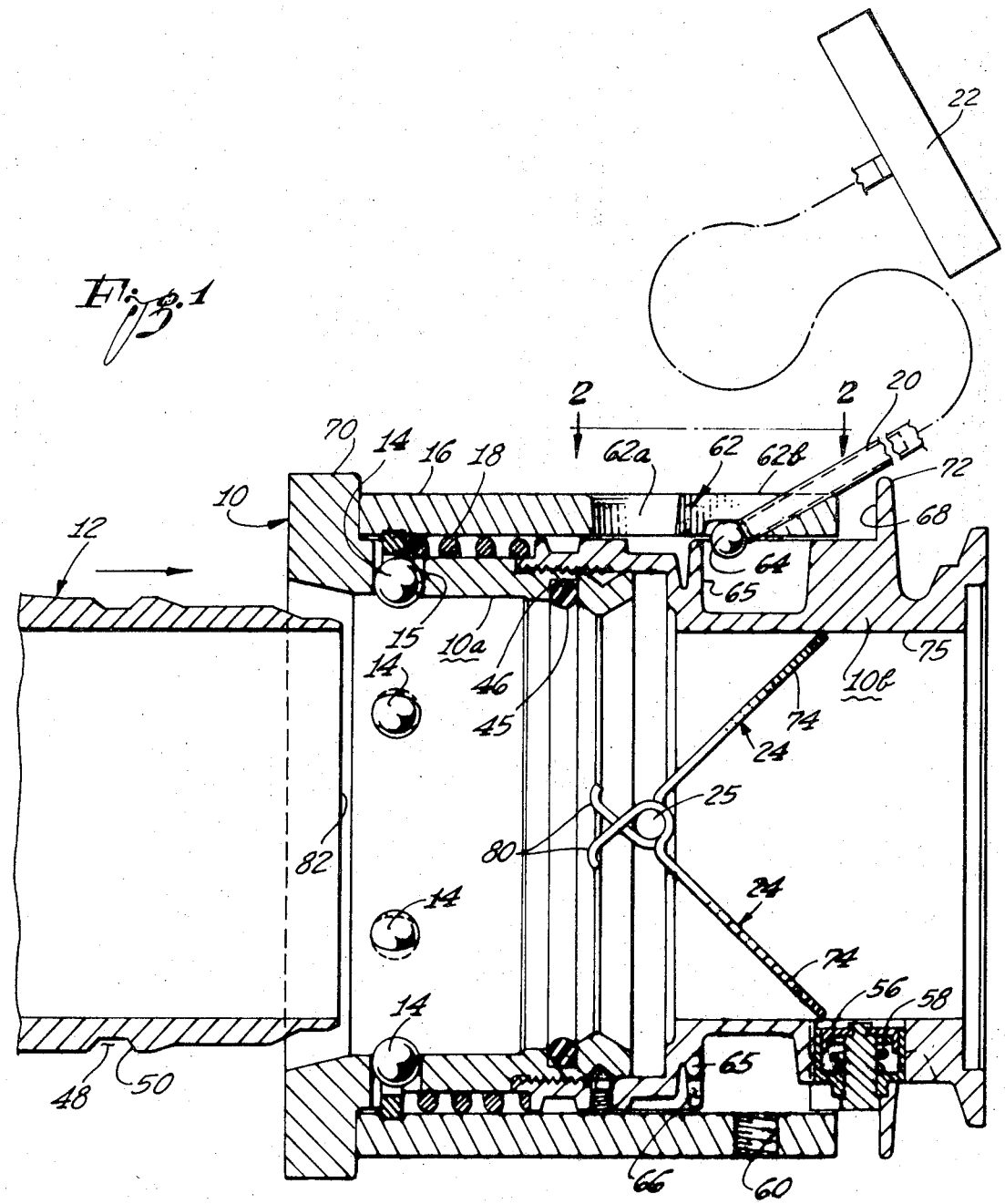
FIG. 1 is a longitudinal sectional view of the socket and the cooperating adapter showing the adapter poised in preparation for telescopic engagement with the adapter.

The principal parts of the selected embodiment of the invention include: a steel socket body generally designated 10, dimensioned to telescopically receive the leading end of a cooperating adapter 12; a circumferential series of locking balls 13 in corresponding radial apertures 15 of the socket body for locking engagement with the adapter; an actuating sleeve 16 embracing the socket body 10 and axially movable thereon between a normal locking position and a retracted release position; a coil spring 18 embracing the socket body 10 inside the actuating sleeve to bias the actuating sleeve towards its locking position; a lanyard 20 connected to the actuating sleeve 16 for manual retraction thereof, the lanyard being provided with a suitable handle 22; a pair of valve leaves 24 that are pivotally mounted on a diametrical crosspin 25, the two valve leaves being biased to closed positions by a cooperating torque spring 26 FIGS. 7 and 8) on the pin; and a clamp ring 28 of a well-known construction for releasably mounting the socket body 10 on the end of a suitable conduit (not shown) that is connected to a suitable portable source of heated compressed air (not shown).

To minimize the weight of the adapter 12 the actuating sleeve 16 is made of aluminum and the steel body 10 is of a special configuration, the steel body being relatively thin where such thinness is permissible, and being relatively thick, where thickness is necessary. Such a steel body may be produced economically by investment casting.

Preferably, the steel socket 10 is made in two sections, 10a and 10b, which are normally secured together by cooperating screw threads 32. To prevent unscrewing of the two sections, section 10b has a tapped radial bore 34 in which is mounted a pointed set screw 35 to bear against a rearwardly facing tapered shoulder 36 that is formed by an outer circumferential groove in the section 10a. The fact that the pointed set screw may make effective engagement with any point along the slope of the tapered shoulder 36 makes possible lateral tolerances in the dimensioning of the two body sections. It is to be noted that the shoulder formed by the inner end 40 of the body section 10a cooperates with an inner circumferential shoulder 42 of the body section 10b to form an inner circumferential groove 44 in which the opposite ends of the diametrical pin 25 are mounted. Thus, making the steel socket body 10 in two sections simplifies the assembly of the diametrical pin to the socket body.

The adapter 12 is of tapered configuration to facilitate telescopic entry into the socket body 10 and is shaped and dimensioned to make sealing contact with an O-ring 45 that is mounted in an inner circumferential groove 46 of the socket body. For cooperation with the locking balls 14, the adapter is formed with an outer circumferential groove 48 (FIG. 1) which provides a tapered rearwardly facing circumferential shoulder 50 for locking contact with the balls.

A feature of the invention is that the aluminum actuating sleeve 16 is provided with a split inner circumferential steel ring 52 for confining the locking balls 14 at their locking positions. One function of the steel ring 52 is to protect the aluminum actuating sleeve from damage by the locking balls 14. Another function is to serve as a shoulder to seat one end of the coil spring 18 that biases the actuating sleeve towards its locking position.

In a well-known manner, the socket body 10 is provided with safety means to prevent retraction of the actuating sleeve 16 to its released position as long as the interior of the socket body is subjected to high fluid pressure. For this purpose a radially positioned safety plunger 54 is mounted in a fixed sleeve 55 and is connected at its inner end to a piston 56 that is slidably mounted in the fixed sleeve. Normally the safety plunger 54 is at a retracted position shown in FIG. 3 by virtue of the pressure of a concealed spring 58 against the piston 56. When the fluid pressure inside the socket body rises, the piston 56 extends the safety plunger 54 radially outward to block retraction of the actuating sleeve 16.

A feature of the invention is the manner in which the lanyard 20 is releasably connected to the actuating sleeve 16 to permit the lanyard to be installed or to be removed at will. In some instances a lanyard is preferred for manual operation of the actuating sleeve, but in other instances a ring-shaped handle (not shown) is desirable. The actuating sleeve 16 has circumferential spaced tapped radial bores 60 which may be used for mounting such a ring-shaped handle.

Figure 2:
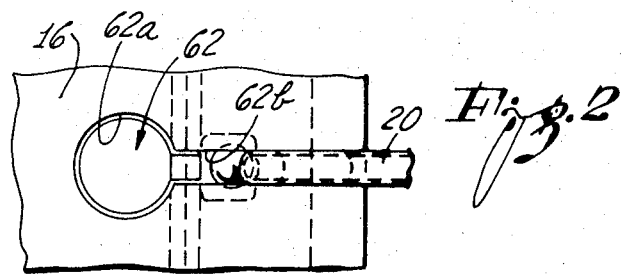
FIG. 2 is a fragmentary plan view as seen along the line 2-2 of FIG. 1 showing structure for releasably connecting a lanyard to the actuating sleeve.

For the purpose of making the lanyard 20 releasable from the actuating sleeve 16, the actuating sleeve 16 is formed with a keyhole aperture 62 as shown in FIGS. 1 and 2. The forward end of the keyhole aperture 62 is enlarged as indicated at 62a to provide clearance for withdrawing a ball enlargement 64 on the inner end of the lanyard. The rearward end 62b of the keyhole aperture 62 is substantially narrower than the diameter of the ball enlargement 64 for the purpose of retaining the ball enlargement. It may be noted that in FIG. 1 the rearward narrow end of the keyhole aperture 62 is cut away to permit the lanyard to swing to a low angle relative to the longitudinal axis of the socket body, the low angle minimizing flexural stressing of the lanyard.

The inner end of the lanyard 20 with the ball enlargement 64 thereon is normally prevented from shifting out of the narrowed portion 62b of the keyhole aperture, any forward movement of the ball enlargement 64 towards the aperture enlargement 62a being blocked by an outer circumferential shoulder in the form of a radial flange 65 of the steel body. This circumferential shoulder 65, however, does have a peripheral recess or notch 66 that is just large enough to clear the ball enlargement 64 of the lanyard.

If it is desired to disengage the lanyard 20 from the actuating sleeve 16, the actuating sleeve 16 is rotated until the recess 66 is visible through the keyhole aperture 62. It is then a simple matter to retract the actuating sleeve 16 manually in opposition to the coil spring 18 and then, as indicated in FIG. 4, to maneuver the ball enlargement 64 of the lanyard 20 forward through the recess 66 and then radially outward through the enlarged end 62a of the keyhole aperture.

It is obvious that a lanyard may be installed as easily by retracting the actuating sleeve with the keyhole aperture of the actuating sleeve in register with the notch 66 of the flange 65. It is to be noted that rearward retraction of the actuating sleeve 16 is limited by a rearward radial circumferential shoulder or stop surface 68 and that when the actuating sleeve is retracted to the maximum the keyhole enlargement 62a does not clear the inner radial flange 65 sufficiently to release the lanyard ball enlargement 64 from captivity. If it should happen that in the course of normal operation of the socket, the keyhole aperture 62 registers with the release notch 66 of the inner radial flange 65, there is no likelihood of inadvertently releasing the lanyard from the actuating sleeve because the actuating sleeve must be retracted to provide an escape path, and since the lanyard is employed to retract the actuating sleeve, the lanyard is necessarily in the narrowed portion 62b of the keyhole aperture as long as the actuating sleeve is retracted.

To protect the aluminum actuating sleeve 16, as well as the clamp ring 28, from impact damage when the socket body is dropped to the ground, the socket body is provided with a relatively heavy forward radial flange 70 and a thinner rearward radial flange 72, the two flanges straddling the actuating sleeve 16 and the rearward flange being relatively close to the clamp ring 28. Since both of the radial flanges 70 and 72 extend radially outward beyond the diameter of the actuating sleeve and beyond the diameter of the clamp ring, all impacts with the ground or pavement are taken by the two radial flanges. The forward radial flange 70 is relatively thick because it may be subjected to lateral impact as distinguished from radial impact, whereas the rearward radial flange 72 is subject primarily to radial impact. It is to be noted that the rearward radial flange 72 not only serves as a guard against impact damage, but also provides the previously mentioned radial stop shoulder 68 for limiting rearward retraction of the actuation sleeve 16. The forward radial flange 70 serves as a stop to limit the forward spring-actuated movement of the actuating sleeve.

The construction and mounting of the two valve leaves 24 may be understood by reference to FIGS. 5 to 8. It is to be noted in FIG. 5 that each of the two valve leaves 24 has an arcuate edge 74 which is of a curvature for relatively snug fit against the inner circumferential surface 75 of the socket body 10 when the valve leaf is in its inclined closed position shown in FIG. 1. It is also to be noted that at the closed positions of the two valve leaves 24 any fluid pressure from the direction of the hose 30 tends to hold the two valve leaves at their closed positions. Thus the two valve leaves function in the manner of a check valve.

The two valve leaves 24 are identical, but as may be seen in FIG. 5, are oppositely oriented with respect to the opposite ends of the diametrical pin 25. The fact that the two valve leaves are identical is a factor in the economical production of the device. Another factor is the relatively few parts that make up the device as a whole.

Each of the identical valve leaves 24 has a tongue 76 formed to cylindrical curvature to extend around approximately 180° of the circumference of the diametrical pin 25. In addition, each of the valve leaves 24 is formed with a second tongue 78 which is of similar curvature to extend around approximately 180° of the circumference of the diametrical pin 25 and which further forms a tangential extension 80 to function as an operating finger. As may be seen in FIG. 1, when the two valve leaves 24 are in their closed positions the two operating fingers 80 extend forward from the diametrical pin 25. The two operating fingers 80 are adjacent opposite ends of the diametrical pin 25 in the path of movement of the leading edge or rim 82 of the adapter 12 when the adapter 12 is moved into telescopic engagement with the socket body. Thus, with the two valve leaves in closed positions as shown in FIG. 4, the insertion of the adapter 12 into the socket body causes the rim 82 of the adapter to abut the two operating fingers 80 and thereby causes the two operating fingers to swing the two valve leaves 24 to their open positions shown in FIG. 3. As may be seen in FIG. 1, the ends of the operating fingers 80 are preferably curved for sliding contact with the rim 82 of the adapter.

An important feature of the valve construction is the simple manner in which the valve structure may be assembled and mounted inside the socket body 10. With the two valve leaves separated from the pin 25 as shown in FIG. 5 the torque spring 26 is first mounted on the pin; then one of the valve leaves 24 is assembled to the pin with one end 84 of the torque spring 26 in abutment with a face of the valve leaf; the torque spring 26 is tightened on the pin; and then the second valve leaf 24 is assembled to the pin with the second end 84 of the torque spring 26 in pressure contact with the second valve leaf 24. Since the two ends 84 of the torque spring 26 urge the curved tongues 76 and 78 of the valve leaves towards engagement with the cross pin 25, the torque spring not only serves its primary purpose of urging the two valve leaves towards their closed position but also serves the additional purpose of keeping the valve leaves assembled to the pin. It is to be noted that if the closed valve leaves are under fluid pressure the fluid pressure also tends to drive the two valve leaves into engagement with the pin 25.

With the two adapter body sections 10a and 10b separated, and with the two valve leaves assembled to the pin 25 in the manner described, the two leaves may be folded together to their open positions shown in FIG. 3. Then the valve assembly with the two valve leaves in their open positions may be inserted into the body section 10b to place the opposite ends of the pin 25 in abutment with the inner circumferential shoulder 42 of the body section 10b, and then the other body section 10a may be threaded into the body section 10b to hold the two ends of the pin captive. The set screw 35 may then be tightened against the tapered shoulder 36 to prevent unscrewing of the two body sections.

It is apparent that the safety plunger 54 prevents release movement of the actuating sleeve 16 so long as the supply hose 30 is under high fluid pressure. It is also apparent that when the fluid pressure is sufficiently low to permit manual retraction of the actuating sleeve 16 for release of the adapter 12, the initial withdrawal movement of the adapter releases the operating fingers 80 to permit the torque spring 26 to swing the two valve leaves 24 to closed position. Thus the two valve leaves will automatically move to their closed positions to prevent any sudden release of residual fluid pressure when the adapter is withdrawn from the socket body. It should be further noted that the provision of the steel ring 52 inside the aluminum actuating sleeve 16 keeps the locking balls 14 from damaging or wearing the actuating sleeve.

My description in specific detail of the selected embodiment of the invention will suggest various changes, substitutions and other departures from my disclosure within the spirit and scope of the appended claims. For example, either or both of the two radial flanges 70, 72 may be separate ring members. FIG. 9 shows how the forward radial flange 70 may be in the form of a separate ring 70a which seats in a circumferential recess 85 of the socket body and is retained therein by a split retaining ring 86 that seats in a corresponding circumferential groove of the socket body. If the socket body 10 is made in one piece instead of two sections, the actuating sleeve 16 and the associated coil spring 18 are installed before the ring 70a is assembled to the socket body.

I claim:

1. In a socket of the character described for releasable engagement with an adapter wider than said enlargement and with the other end of the aperture narrower the socket has a body equipped with means to engage the adapter and an actuating sleeve embracing the body is biased to move axially from a release position to a second position at which it locks the engagement means and wherein a lanyard is operatively connected to the actuating sleeve to move the actuating sleeve from its second position to its first position, the improvement to make the lanyard releasable from the actuating sleeve, comprising:

said lanyard having an enlargement on its inner end;

said actuating sleeve having a keyhole aperture therein with one end of the aperture wider than said enlargement and with the other end of the aperture narrower than the enlargement, said lanyard normally extending through said narrow end of the keyhole aperture for pulling the actuating sleeve to its release position;

said body having a circumferential outer shoulder inside the actuating sleeve positioned to block movement of the lanyard enlargement out of the narrow end of the keyhole aperture, said circumferential shoulder having a recess dimensioned to clear the lanyard enlargement whereby the actuating sleeve may be rotated to register the keyhole aperture with said recess to permit the lanyard enlargement to be moved through the recess into the wider end of the keyhole aperture for release from the actuating sleeve.

2. An improvement as set forth in Claim 1 in which said narrow end of the keyhole aperture is cut away to permit the lanyard to extend through the actuating sleeve at a relatively low angle with respect to the longitudinal axis of the sleeve.

3. In a coupling for releasable engagement with a passage member for conveyance of a stream of fluid, the combination of:

a cylindrical coupling body forming a fluid passage;

a pin extending diametrically across said passage;

a pair of valve leaves hingedly mounted on the pin inside the coupling body to swing between open positions at which the leaves are close together to permit fluid flow through the body and closed positions at which the two leaves are spread apart to oppose fluid flow in an axial direction from one end of the body, said leaves at their closed positions being divergent towards said one end of the body with each leaf inclined towards said one end of the body at an acute angle to the axis of the body with the outer edges of the leaves substantially conforming to the inner circumferential surface of the body whereby the greater the pressure of the fluid at the closed position of the valve leaves, the greater the pressure of the valve leaves against said inner circumferential surface;

spring means biasing the two leaves divergently towards their closed position;

a flexible hose with the coupling body mounted on the end of the hose;

means on said body to releasably engage said passage member;

an actuating sleeve embracing the body and movable between a first released position and a second locking position at which it locks the engagement means; and two circumferential radial flanges integral with said body adjacent the opposite ends of the actuating sleeve, said flanges extending radially outward beyond the radius of the actuating sleeve to protect the actuating sleeve when the hose with the body thereon is dropped onto a hard surface.

4. In a coupling for releasable engagement with a passage member for conveyance of a stream of fluid, the combination of:

a cylindrical coupling body forming a fluid passage;

a pin extending diametrically across said passage;

a pair of valve leaves hingedly mounted on the pin inside the coupling body to swing between open positions at which the leaves are close together to permit fluid flow through the body and closed positions at which the two leaves are spread apart to oppose fluid flow in an axial direction from one end of the body, said leaves at their closed positions being divergent towards said one end of the body with each leaf inclined towards said one end of the body at an acute angle to the axis of the body with the outer edges of the leaves substantially conforming to the inner circumferential surface of the body whereby the greater the pressure of the fluid at the closed position of the valve leaves, the greater the pressure of the valve leaves against said inner circumferential surface;

spring means biasing the two leaves divergently towards their closed positions;

engagement means to engage the passage member;

an actuating sleeve embracing the body and movable between a first release position and a second locking position at which it locks the engagement means, said actuating sleeve being biased to its second locking position; and a lanyard to retract the actuating sleeve to its first release position, said lanyard having an enlargement on its inner end, said actuating sleeve having a keyhole aperture therein with one end of the aperture wider than said enlargement and with the other end of the aperture narrower than the enlargement, said lanyard normally extending through said narrow end of the keyhole aperture for pulling the actuating sleeve to its release position, said body having a circumferential outer shoulder inside the actuating sleeve positioned to block movement of the lanyard enlargement out of the narrow end of the keyhole aperture, said circumferential shoulder having a recess dimensioned to clear the lanyard enlargement whereby the actuating sleeve may be rotated to register the keyhole aperture with said recess to permit the lanyard enlargement to be moved through the recess into the wider end of the keyhole aperture for release from the actuating sleeve.